(12) United States Patent
Takao

(10) Patent No.: US 7,337,979 B2
(45) Date of Patent: Mar. 4, 2008

(54) CARD CASE, IC CARD, AND IC CARD UNIT

(75) Inventor: Hiroki Takao, Suwa (JP)

(73) Assignee: Seiko Epson Corporation (JP)

( * ) Notice: Subject to any disclaimer, the term of this patent is extended or adjusted under 35 U.S.C. 154(b) by 233 days.

(21) Appl. No.: 11/324,797

(22) Filed: Jan. 3, 2006

(65) Prior Publication Data
US 2006/0144953 A1 Jul. 6, 2006

(30) Foreign Application Priority Data
Jan. 4, 2005 (JP) ............... 2005-000083

(51) Int. Cl.
- G06K 5/00 (2006.01)
- G06K 19/06 (2006.01)
- G06K 7/00 (2006.01)
- G06K 9/74 (2006.01)
- G06K 9/00 (2006.01)

(52) U.S. Cl. ............ 235/492; 235/486; 235/382; 382/124; 356/71

(58) Field of Classification Search ............ 235/492, 235/380, 486, 382, 487; 382/124; 356/71
See application file for complete search history.

(56) References Cited

U.S. PATENT DOCUMENTS

| | | | | |
|---|---|---|---|---|
| 4,202,120 A | * | 5/1980 | Engel | 283/99 |
| 4,783,823 A | * | 11/1988 | Tasaki et al. | 235/380 |
| 4,791,608 A | * | 12/1988 | Fushimoto | 235/492 |
| 6,112,996 A | * | 9/2000 | Matsuo | 235/492 |
| 6,213,403 B1 | * | 4/2001 | Bates, III | 235/492 |
| 6,343,744 B1 | * | 2/2002 | Shibata et al. | 235/492 |
| 6,567,539 B1 | * | 5/2003 | Benezeth | 382/124 |
| 6,594,154 B1 | * | 7/2003 | Brewer et al. | 235/492 |
| 6,631,201 B1 | * | 10/2003 | Dickinson et al. | 382/124 |
| 2005/0247784 A1 | * | 11/2005 | Klatt | 235/486 |

FOREIGN PATENT DOCUMENTS

| | | |
|---|---|---|
| JP | 2004-220175 | 8/2004 |
| JP | 2004220175 A * | 8/2004 |

* cited by examiner

Primary Examiner—Michael G. Lee
Assistant Examiner—Thien T Mai
(74) Attorney, Agent, or Firm—Harness, Dickey & Pierce, P.L.C.

(57) ABSTRACT

A card case, which encases an IC card having a functional section that contains a biometric information-acquiring portion for acquiring biometric information and carries out communication with an outer part of the card when the biometric information acquired at the biometric information-acquiring portion is authenticated and having a power section that supplies power to the functional section, the card case including: a case body that can encase the IC card and has an opening at a position two-dimensionally overlapping with the biometric information-acquiring portion so that the biometric information-acquiring portion of the encased IC card is exposed outside the case; a lid that covers the opening and is capable of opening and closing; a functional section electrode that is provided on the case body and is electrically connected to the functional section of the IC card encased in the case body; a power section electrode that is provided on the case body and is electrically connected to the power section of the IC card encased in the case body; and a connection section that electrically connects the functional section electrode with the power section electrode in a state that the lid is open.

6 Claims, 7 Drawing Sheets

CARD CASE, IC CARD, AND IC CARD UNIT

BACKGROUND OF THE INVENTION

1. Technical Field

The present invention relates to a card case, an IC card, and an IC card unit.

2. Related Art

In recent years, cards containing personal information such as an ID card and a credit card have been in use for electronic commerce and the like. In order to prevent fraudulent transactions of these cards, some cards can authenticate the card user by acquiring the user's personal information so as to confirm that the user is the right card owner.

For example, an IC card using fingerprint information for the authentication has been proposed, in that: the fingerprint information of an individual is read out; a fingerprint authentication chip that determines authenticity of the read out fingerprint is mounted on the IC card; and by determining whether the fingerprint authentication information stored inside the chip matches with the read out fingerprint information, the individual's authentication is conducted (e.g., JP-A-2004-220175).

In order to prevent malfunctions, electric consumption increase, and the like of the IC card, such an IC card is equipped with a switch, for example, that controls on/off of the IC card. Further, since the fingerprint authentication chip is exposed on the surface of the IC card, the IC card is generally held in a card case when not in use so as not to damage the fingerprint authentication chip.

However, when the IC card is encased in a card case, the switch and a fingerprint sensor are also inside the card case. Therefore, in order to acquire the biometric information by turning on the power of the IC card in this situation, the user must go through the trouble of taking out the IC card from the card case each time. In particular, if the user uses the IC card frequently, it is troublesome to put the IC card in and out of the card case every time he or she uses the IC card. Further, if the user frequently puts in and out the IC card, the fingerprint authentication chip can be easily damaged.

SUMMARY

An advantage of the invention is to provide a card case, an IC card, and an IC card unit that enable usage of the IC card even when the IC card is encased.

According to an aspect of the invention, a card case of the present invention, which encases an IC card having a functional section that contains a biometric information-acquiring portion for acquiring biometric information and carries out communication with an outer part of the card when the biometric information acquired at the biometric information-acquiring portion is authenticated and having a power section that supplies power to the functional section, includes: a case body that can encase the IC card and has an opening at a position two-dimensionally overlapping with the biometric information-acquiring portion so that the biometric information-acquiring portion of the encased IC card is exposed outside the case; a lid that covers the opening and is capable of opening and closing; a functional section electrode that is provided on the case body and is electrically connected to the functional section of the IC card encased in the case body; a power section electrode that is provided on the case body and is electrically connected to the power section of the IC card encased in the case body; and a connection section that electrically connects the functional section electrode with the power section electrode in a state that the lid is open.

In the invention, when the lid is opened in the state that the IC card is encased, the functional section electrode and the power section electrode are electrically connected, and the power is supplied to the functional section of the IC card. With the power supply to the functional section of the IC card, the functional section containing the biometric information-acquiring portion starts functioning. Further, when the lid is opened while the IC card is encased, the biometric information-acquiring portion is exposed outside the case, and the IC card can acquire the biometric information even from the outside of the case.

Consequently, it is possible to use the IC card even when it is encased. Even when the IC card having, for example, a switch for supplying the power to the functional section is encased, it is not necessary to take it out in order to operate the switch.

Further, it is preferable that the connection section electrically interrupts the functional section electrode from the power section electrode in a state that the lid is closed.

According to such a structure, when the lid is closed in the state that the IC card is encased, the power is not supplied to the functional section, and, therefore, it is possible to prevent the power supply when the IC card is not in use and to suppress, for example, malfunctions of the IC card. Also, since the power is supplied to the functional section only when the lid is open, electric consumption can be reduced.

Furthermore, it is preferable that the connection section includes: first wire connected to the functional section electrode and having an end part near the opening; second wire connected to the power section electrode and having an end part near the opening in a manner that the second wire is not connected to the first wire; and an electrode provided so as to abut on the end part of the first wire and on the end part of the second wire in a state that the lid is open.

With such a structure, because the end part of the second wire is provided close to the end part of the first wire, it is possible to form the electrode, which is to be abutted on each end part of the wires, to be small. In this case, it is preferable that the electrode is provided on the lid. In particular, because it is necessary to form the electrode within the limits of the lid when forming the electrode on the lid, it is significant that the electrode can be made small.

According to another aspect of the invention, an IC card includes: a substrate; a functional section that is provided on the substrate, includes a biometric information-acquiring portion for acquiring biometric information, and communicates with an outer part of the card when the biometric information acquired at the biometric information-acquiring portion is authenticated; a power section that is provided on the substrate and supplies power to the functional section; a functional section terminal that is provided on the substrate so as to be electrically connected to the functional section and is electrically connected to the functional section electrode inside the above-referenced card case; and a power section terminal that is provided on the substrate so as to be electrically connected to the power section and is electrically connected to the power section electrode inside the above-described card case.

In the invention, when the IC card is encased in the card case, the functional section terminal and the power section terminal provided on the substrate are electrically connected through the connection section (the first wire, the second wire, and the electrode) of the card case. Consequently, even when the IC card is encased in the card case, the power section can supply the power to the functional section, enabling the functional section that has received the power to function.

According to yet another aspect of the invention, an IC card unit includes: an IC card containing: a substrate; a functional section that is provided on the substrate, includes a biometric information-acquiring portion for acquiring biometric information, and communicates with an outer part of the card when the biometric information acquired at the biometric information-acquiring portion is authenticated; a power section that is provided on the substrate and supplies power to the functional section; a functional section terminal that is provided on the substrate and is electrically connected to the functional section; and a power section terminal that is provided on the substrate and is electrically connected to the power section; and the card case containing: a case body that can encase the IC card and has an opening at a position two-dimensionally overlapping with the biometric information-acquiring portion so that the biometric information-acquiring portion of the encased IC card is exposed outside the case; a lid that covers the opening and is capable of opening and closing; a functional section electrode that is provided on the case body and is electrically connected to the functional section of the IC card encased in the case body; a power section electrode that is provided on the case body and is electrically connected to the power section of the IC card encased in the case body; and a connection section that electrically connects the functional section electrode with the power section electrode in a state that the lid is open.

In the invention, when the lid of the card case is opened in the state that the IC card is encased in the card case, the functional section and power section of the IC card are electrically connected by the connection section (the first wire, the second wire, and the electrode) provided on the case body, and the power is supplied to the functional section of the IC card. Further, when the lid is opened in the state that the IC card is encased in the card case, the biometric information-acquiring portion of the IC card is exposed outside the card case, and th IC card can acquire the biometric information even from the outside of the card case. Accordingly, it is possible to use the IC card while being encased in the card case.

BRIEF DESCRIPTION OF THE DRAWINGS

The invention will be described with reference to the accompanying drawings, wherein like numbers reference like elements.

DESCRIPTION OF THE EMBODIMENT

The first embodiment of the invention will now be described based on the drawings.

Figure 1:
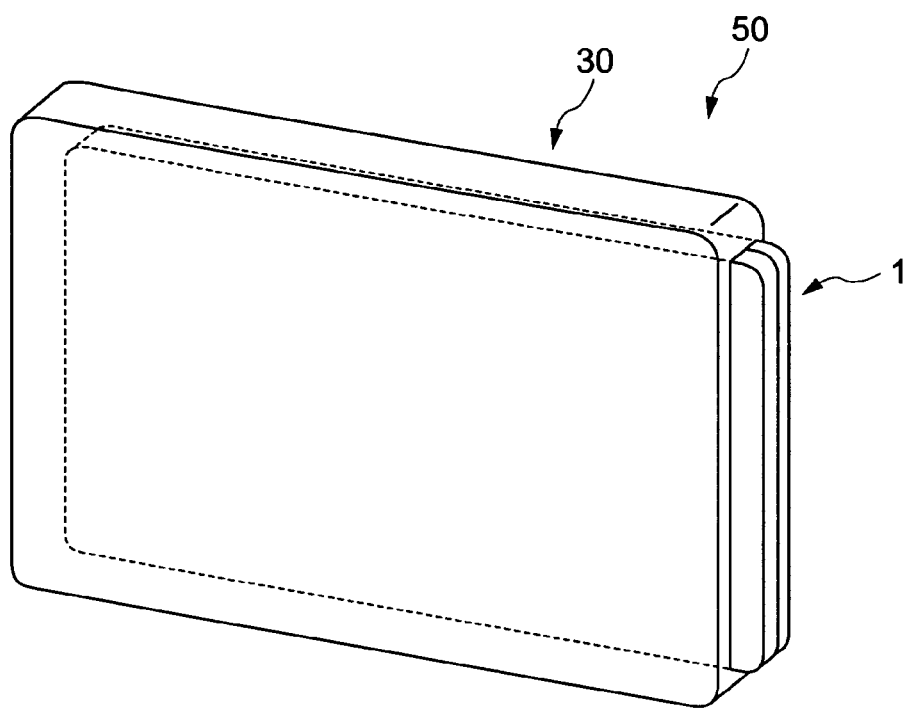
FIG. 1 is a perspective diagram (1) showing a structure of an IC card unit of a first embodiment of the invention.

FIG. 1 is a plan view of a structure of an IC card unit 50 of the present embodiment. The IC card unit 50 is mainly composed of a card case 30 for encasing a card and an IC card 1 encased in this card case 30. The IC card 1 is a card that has stored the owner's personal information, such as a credit card, a cash card (an ATM card), and a company ID card, which needs to be authenticated when used.

Figure 2:
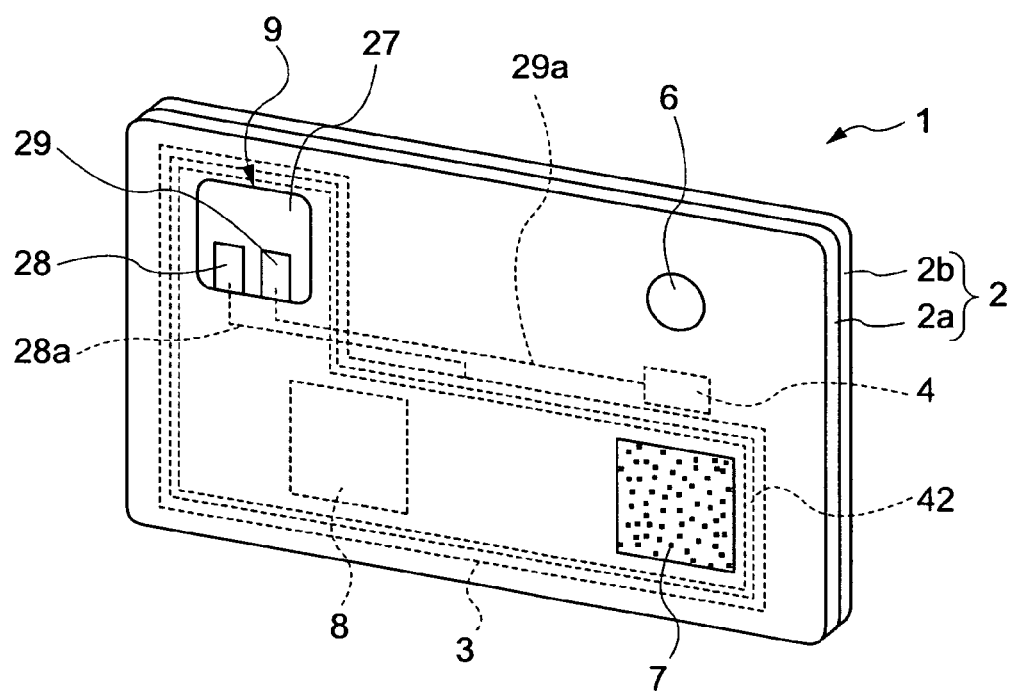
FIG. 2 is a perspective diagram showing the structure of the IC card of the embodiment.

FIG. 2 is a perspective diagram showing the structure of the IC card 1.

The IC card 1 is mainly composed of a card substrate 2, a functional section 3, a power section 4, and a switch 6. The IC card 1 is about the same size as, for example, a credit card. By turning on the switch 6, power can be supplied from the power section 4 to the functional section 3. The IC card 1 is designed so that the power supplied to the functional section 3 can be switched on and off and that the power is turned off when the switch 6 is left pressed down for a long period of time.

The card substrate 2 is formed by attaching together base materials 2a and 2b made of plastic or the like and holds the functional section 3, power section 4, and the switch 6. On the base materials 2a and 2b, there are formed an opening and the like so that the switch 6 and the like are exposed therefrom.

The functional section 3 functions in a manner that it acquires, for example, a fingerprint formed on a finger of a person as the biometric information, authenticates the acquired biometric information, and communicates with the outer part of the card when the authentication is done. The functional section 3 is mainly composed of a fingerprint sensor (a biometric information-acquiring portion) 7 for acquiring biometric information, a control department 8 for carrying out the authentication and the like of the biometric information, and an outer terminal 9 for communicating with outer devices (not shown) such as a card terminal.

Figure 3:
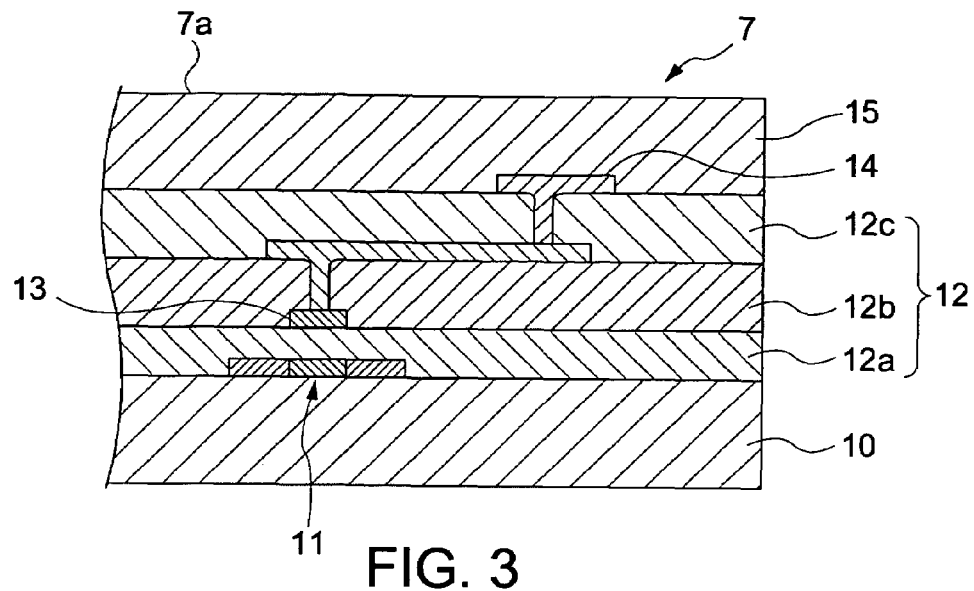
FIG. 3 is a cross-sectional diagram (1) showing a structure of a fingerprint sensor.

The fingerprint sensor 7 is a sensor for detecting a fingerprint configuration (a fingerprint pattern) in the acquirement of the fingerprint as the biometric information and is exposed at the surface of the card substrate 2. As shown in FIG. 3, the fingerprint sensor 7 includes: a sensor substrate 10 made of an insulating material such as glass, a switching element 11 formed on this sensor substrate 10, a gate electrode 13 provided on this switching element 11 via a lower layer 12a of an interlayer insulating layer 12, a capacitance detection electrode 14 connected to this gate electrode 13 and arranged in matrix on an upper layer 12c of the interlayer insulating layer 12, and a surface insulating layer 15 provided so as to cover this capacitance detection electrode 14. Further, there is a middle layer 12b between the lower layer 12a and the upper layer 12c.

Figure 4:
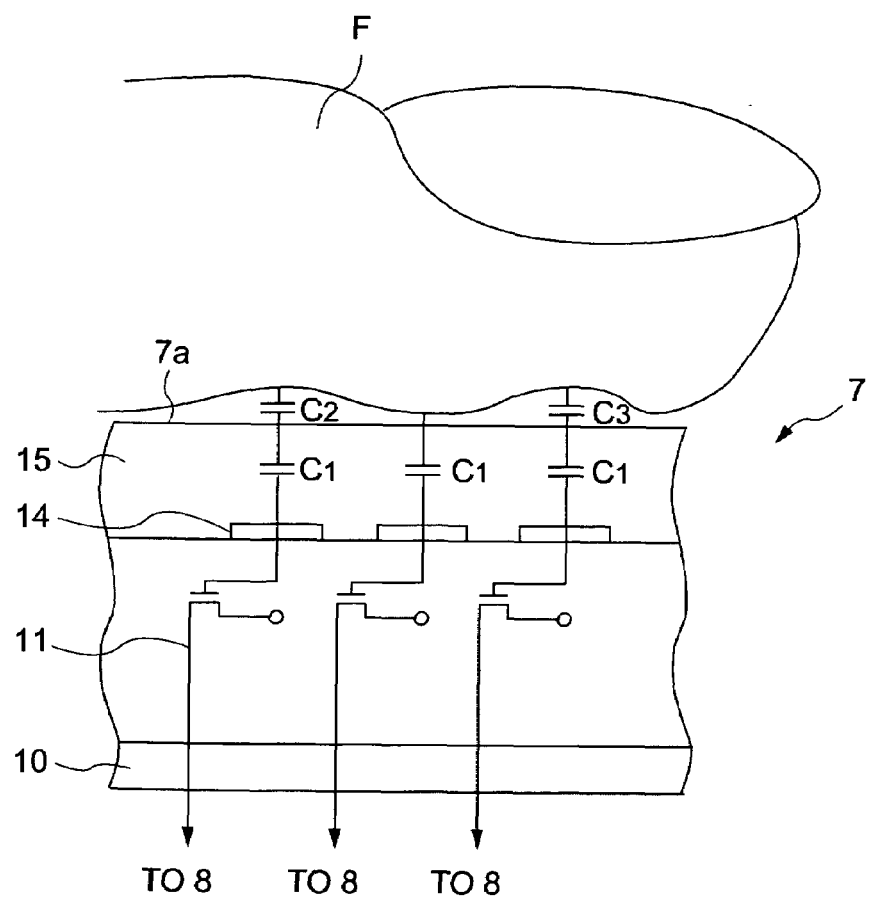
FIG. 4 is a cross-sectional diagram (2) showing the structure of the fingerprint sensor.

As shown in FIG. 4, when a finger F having on its surface a fingerprint pattern configured with minute ridges and grooves comes into contact with a detection surface 7a of the fingerprint sensor 7, capacitances (C1, C2, and C3, for example) are generated between the finger F and each of the capacitance detection electrodes 14 arranged in matrix.

These capacitances C1, C2, and C3 will have values corresponding to distances between the fingerprint formed on the finger F and each of the capacitance detection electrodes 14. Each of the detected capacitances C1, C2, and C3 is transmitted to the control department 8.

Figure 5:
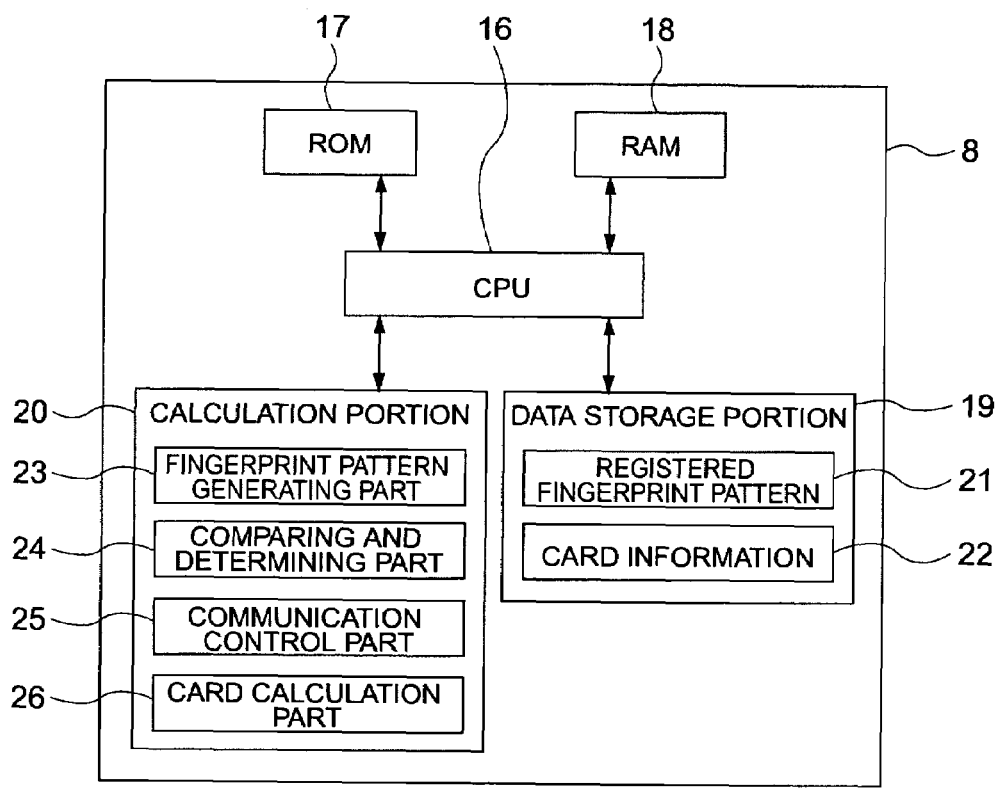
FIG. 5 is a block diagram showing a structure of a control department.

As shown in FIG. 5, the control department 8 includes: a CPU 16, a ROM 17, and a RAM 18 for carrying out processes, a data storage portion 19 for storing data, and a calculation portion 20 for carrying out various calculations.

The data storage portion 19 is composed of, for example, an electrically erasable programmable read-only memory (an EEPROM) and stores data of the fingerprint pattern (a registered fingerprint pattern) 21 registered by the user of the IC card 1 and information (card information) 22 relating to the IC card 1 such as a credit card number or a company ID number.

The calculation portion 20 includes: a fingerprint pattern generating part 23 which calculates a distribution of the distances between the finger F and the capacitance detection electrodes 14 using the values of the capacitances C1, C2, and C3 detected by the fingerprint sensor 7 and generates the fingerprint pattern based on this distance distribution, a comparing and determining part 24 which compares the fingerprint pattern generated at the fingerprint pattern generating part 23 with the registered fingerprint pattern stored in the data storage portion 19 and determines whether or not they match, a communication control part 25 that controls whether or not the IC card 1 is able to communicate, and a card calculation part 26 that carries out calculations and the like concerning the card information.

Referring again to FIG. 2, the outer terminal 9 includes: a contact IC terminal 27 which directly comes in contact with the outer devices, as an interface that carries out information exchanges, a non-contact IC antenna 42 which receives and sends electric waves having a predetermined wavelength from and to the outer devices, a functional section terminal 28 electrically connected to the functional section 3 via, for example, wire 28a, and a power section terminal 29 electrically connected to the power section 4 via, for example, wire 29a. The contact IC terminal 27, the functional section terminal 28, and the power section terminal 29 are each electrically insulated.

Now, a card case 30 encasing thus structured IC card 1 will be described.

Figure 6:
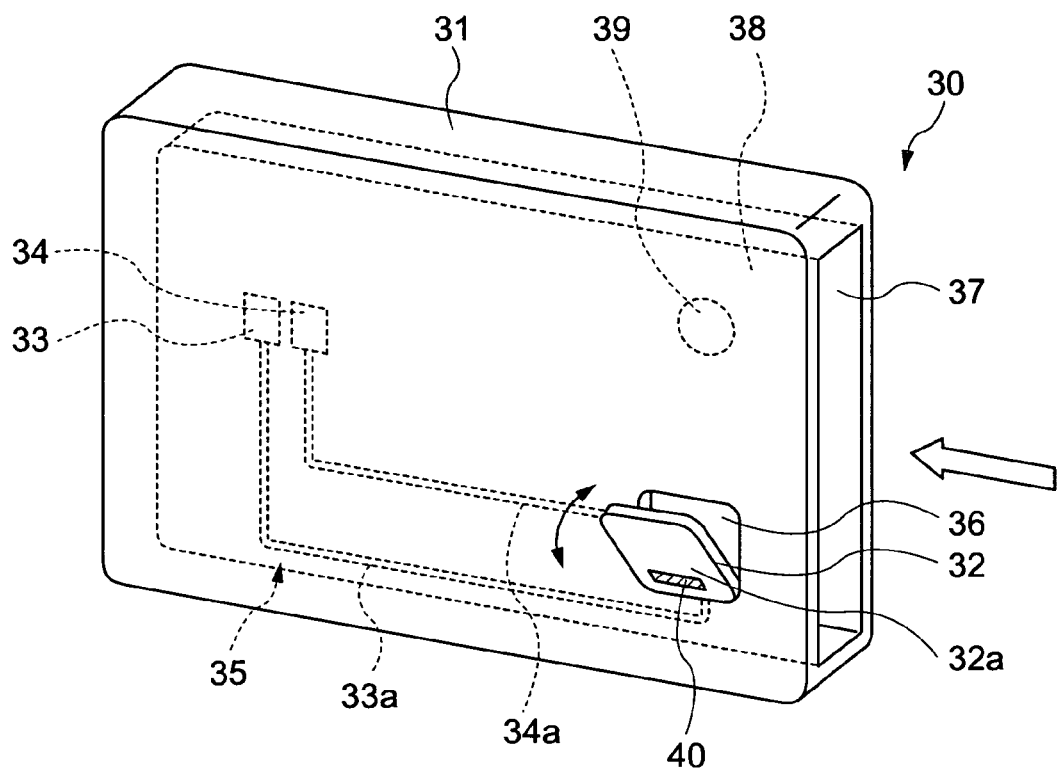
FIG. 6 is a perspective diagram showing a structure of a card case of the embodiment.
Figure 7:
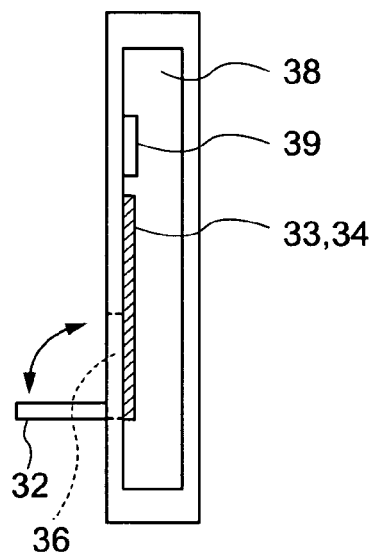
FIG. 7 is a side view of the structure of the card case.
Figure 8:
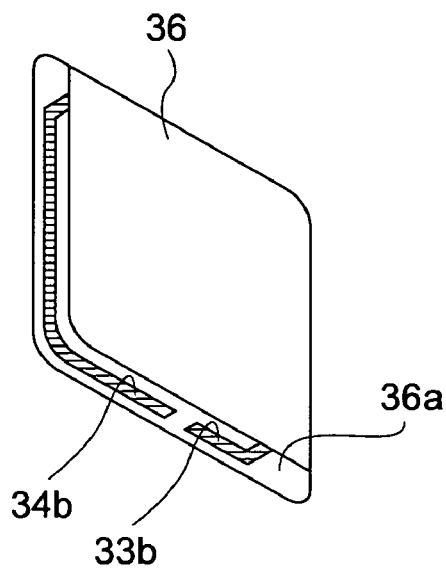
FIG. 8 is a perspective diagram (1) showing a structure of an opening of the card case.
Figure 9:
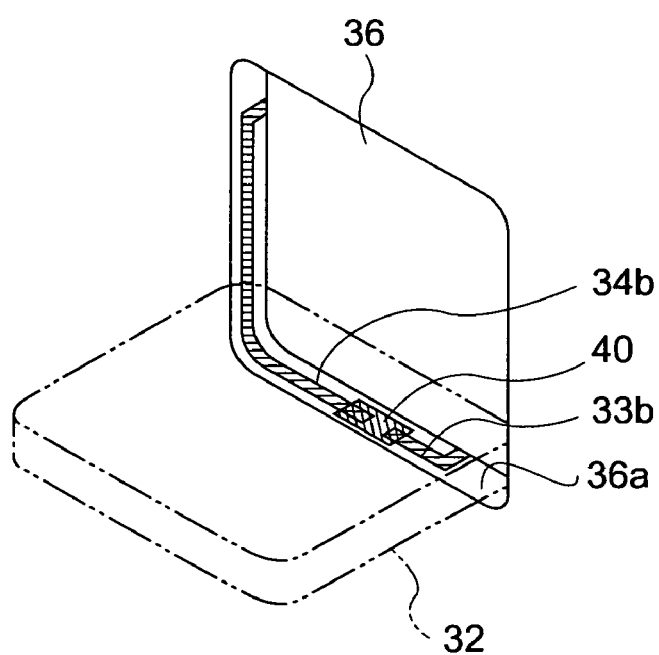
FIG. 9 is a perspective diagram (2) showing the structure of the opening of the card case.

FIG. 6 is a perspective diagram showing the structure of the card case 30. FIG. 7 is a diagram (a side view) of the card case 30 seen in a direction of an arrow in FIG. 6. FIGS. 8 and 9 are enlarged diagrams of a portion containing an opening 36.

As shown in FIG. 6, the card case 30 is mainly composed of a case body 31 for encasing the IC card 1 and a lid 32 attached to this case body 31.

The case body 31 is a box-shaped member for encasing the IC card 1. The case body 31 is formed using a bendable and transparent resin material. As such a resin material, a plastic material having good dimensional stability such as acrylic, polyimide, polyethylene terephthalate (PET), polyethylene naphthalate (PEN), or the like can be used.

The case body 31 is provided with a card entrance 37, an encasing portion 38, and the opening 36. The card entrance 37 is a portion for inserting in and taking out the IC card 1. The encasing portion 38 is a portion for encasing the IC card 1. The opening 36 is provided at a position two-dimensionally overlapping with the fingerprint sensor 7 in a manner that the fingerprint sensor 7 of the IC card 1 is exposed outside the case in the state that the IC card 1 is encased.

As shown in FIG. 7, the encasing portion 38 contains a functional section electrode 33, a power section electrode 34, and a protrusion 39. In the state that the IC card 1 is encased, the functional section electrode 33 is provided at a position two-dimensionally overlapping with the functional section terminal 28 of the IC card 1; the power section electrode 34 is provided at a position two-dimensionally overlapping with the power section terminal 29; and the protrusion 39 is provided at a position two-dimensionally overlapping with the switch 6 of the IC card 1. In the state that the IC card 1 is encased in the encasing portion 38, the functional section electrode 33 abuts on the functional section terminal 28; the power section electrode 34 abuts on the power section terminal 29; and the protrusion 39 presses down the switch 6. Further, as shown in FIG. 8, an end part 33b of wire 33a and an end part 34b of wire 34a are both provided on a surface 36a of the opening 36. The end part 34b is provided close to the end part 33b.

The lid 32 is provided so as to cover the opening 36 of the case body 31 and is capable of opening and closing. A surface 32a of the lid 32 is provided with a switch electrode 40. In the state that the lid 32 is open, as shown in FIG. 9, the surface 32a abuts on the surface 36a of the opening 36. Note that, in addition to what is described here, the lid may be structured so as to slide to open and close.

Here, the switch electrode 40 provided on the surface 32a abuts on each of the end part 33b of the wire 33a and the end part 34b of the wire 34a so that the end part 33b and the end part 34b are electrically connected. Thus, a connection section 35 (see FIG. 6) is composed of the wire 33a (including the end part 33b), the wire 34a (including the end part 34b), and the switch electrode 40.

Figure 10:
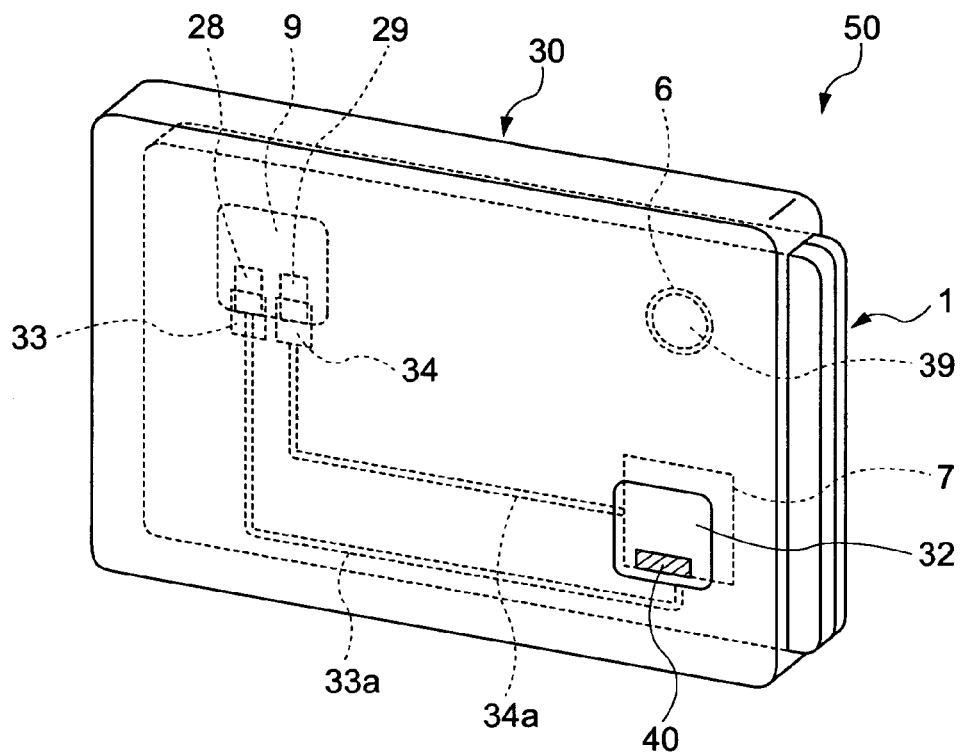
FIG. 10 is a perspective diagram (2) showing a structure of an IC card unit of the embodiment.

FIG. 10 is a diagram illustrating how the IC card 1 is encased in the card case 30.

With the IC card unit 50 encasing the IC card 1 in the card case 30, as shown in this drawing, the protrusion 39 provided at the encasing portion 38 of the card case 30 presses down the switch 6 of the IC card 1 and keeps pressing it down. Therefore, in this state, the functional section 3 of the IC card 1 is turned off.

Figure 11:
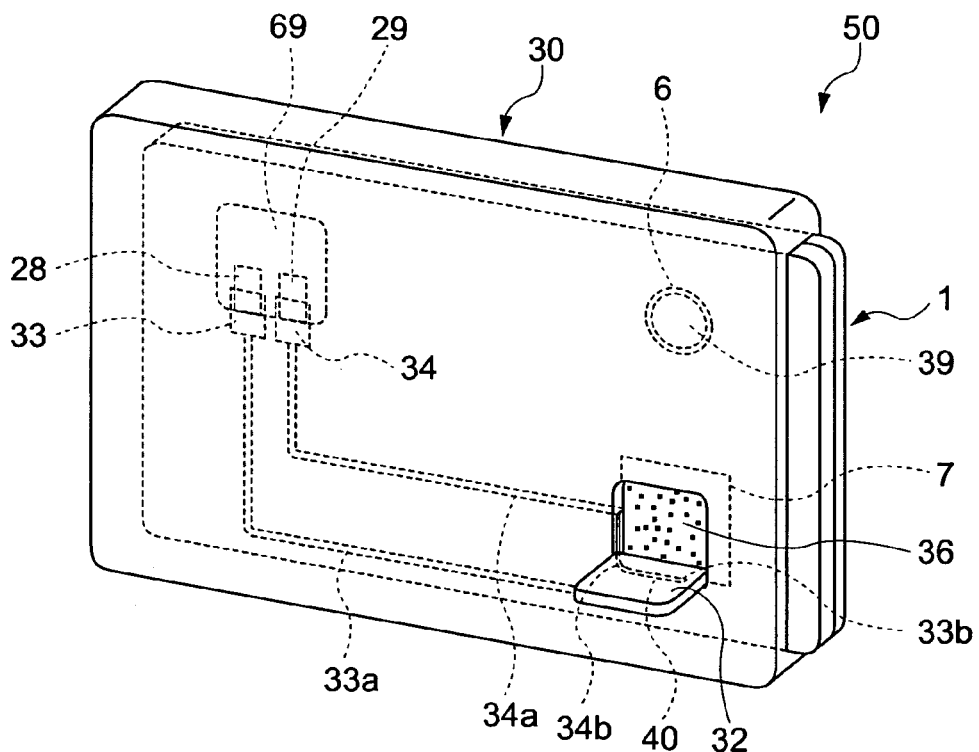
FIG. 11 is a perspective diagram (3) showing the structure of the IC card unit of the embodiment.

FIG. 11 shows a state in which the lid 32 of the card case 30 is opened. When the lid 32 is opened, the switch electrode 40 abuts on each of the end part 33b of the wire 33a and the end part 34b of the wire 34a, and the end part 33b and the end part 34b become electrically connected. When the end part 33b and the end part 34b are electrically connected, the functional section 3 and the power section 4 are electrically connected via the switch electrode 40, the wires 33a and 34a, the functional section electrode 33, and the power section electrode 34, and, thereby, the functional section 3 turns to the on state. Since the IC card 1 is encased in the card case 30 and the contact IC terminal 27 is not exposed, the communication between the IC card 1 and the outer part is carried out via the non-contact IC antenna 42.

Next, the communication between the IC card unit 50 and the outer part will be described.

In the following, a company ID card that has stored the employee's ID number is exemplified as the IC card 1, and an employee authentication system that unlocks the door by authenticating this employee's ID number is exemplified as "the outer part."

Figure 12:
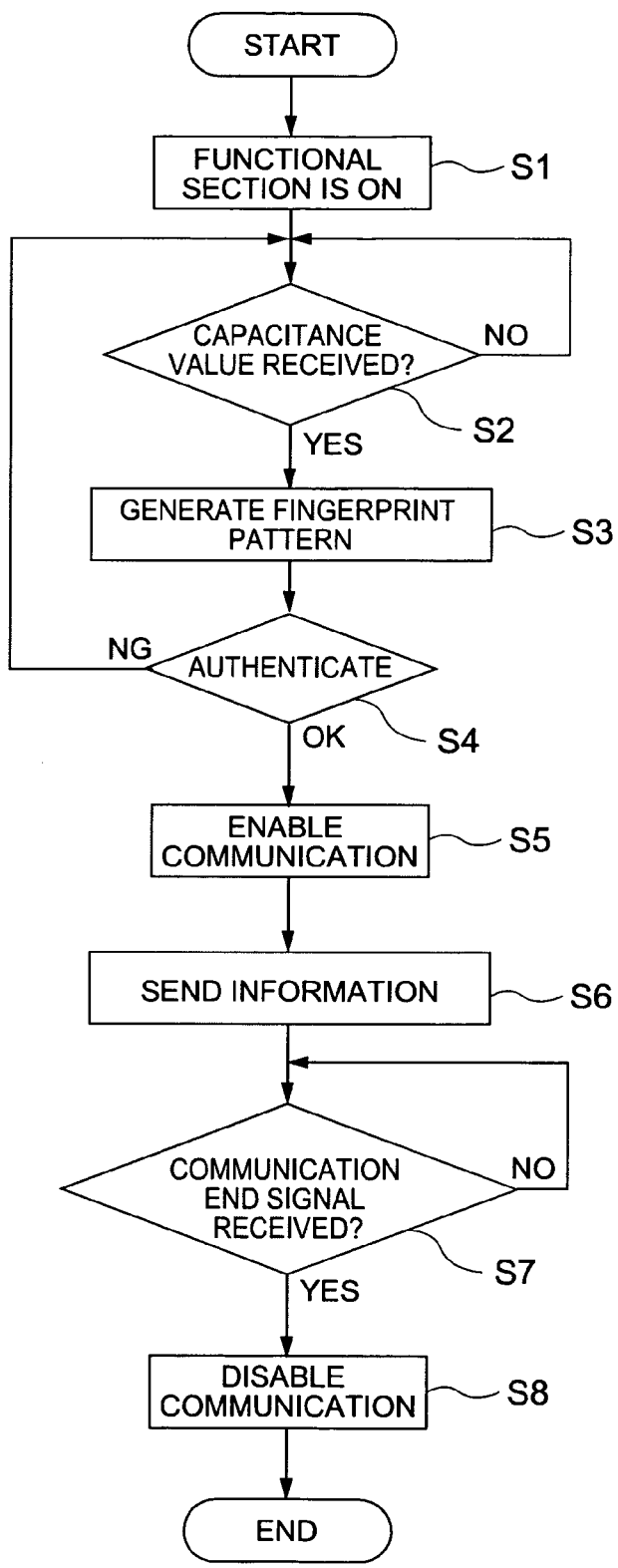
FIG. 12 is a flow chart showing a procedure of operations (communication) of the IC card unit of the embodiment.

FIG. 12 is a flowchart showing the procedure of the communication of the IC card unit 50.

In the state that the IC card 1 is encased in the card case 30, the switch 6 is kept pressed down, and, thereby, the functional section 3 of the IC card 1 stays in the off state. When the user opens the lid of the card case 30 while the IC card 1 is encased in the card case 30, the power is supplied to the functional section 3, and the functional section 3 of the IC card 1 becomes the on state (step S1).

While the functional section 3 is in the on state and when the user abuts the finger F from the outside of the card case 30 against the surface 7a of the fingerprint sensor 7 exposed at the opening 36, the fingerprint sensor 7 detects the capacitances C1, C2, and C3 generated between the finger F and each of the capacitance detection electrodes 14 and sends out the values to the fingerprint pattern generating part 23 of the control department 8.

When the fingerprint pattern generating part 23 receives the values of the capacitances C1, C2, and C3 (YES at step S2), it calculates the distances between the finger F and the capacitance detection electrodes 14 using these values of the capacitances C1, C2, and C3 and generates the fingerprint pattern based on these distances (step S3). The comparing and determining part 24 reads out the registered fingerprint pattern 21 that was stored in advance in the data storage portion 19 and determines (authenticates) whether or not the fingerprint pattern generated in the step S3 matches with the registered fingerprint pattern 21 (step S4).

If the comparing and determining part 24 determines that the fingerprint pattern matches with the registered fingerprint pattern 21 (OK at the step S4), the communication control part 25 turns the IC card 1 to be a communicable state (step S5). In contrast, if it is determined that the fingerprint pattern does not match with the registered fingerprint pattern 21 (NG at the step S4), the communication control part 25 maintains the IC card 1 to be in an incommunicable state.

When the IC card 1 turns to be in the communicable state, the card calculation part 26 sends a communication start signal as well as the information necessary for the employee authentication, such as the employee number and the like stored in the data storage portion 19, to the employee authentication system via the non-contact IC antenna 42 (step S6). Once the employee authentication system receives the communication start signal and the information necessary for the employee authentication, it determines whether or not this employee number matches with the registered number.

If it is determined that the employee number matches, the authentication system unlocks the door and sends a communication end signal to the IC card 1. If the employee number does not match, the authentication system sends the communication end signal to the IC card 1 without unlocking the door. When the card calculation part 26 receives the communication end signal from the authentication system via the non-contact IC antenna 24 (YES at step S7), the communication control part 25 again turns the IC card 1 to be the incommunicable state (step S8).

The communication is now complete. In order to continue the communication from this point, the user needs only to abut the finger F against the surface 7a of the fingerprint sensor 7 without closing the lid 32 so that the IC card 1 turns to be the communicable state. Further, if the user closes the lid 32, the power stops being supplied to the functional section 3, and the IC card 1 turns to be the off state.

Thus, in the embodiment, by opening the lid 32 of the card case 30 in the state that the IC card 1 is encased in the card case 30, the functional section 3 and the power section 4 of the IC card 1 are electrically connected by the connection section 35 provided on the case body 31, and the power is supplied to the functional section 3 of the IC card 1. Further, by opening the lid 32 of the card case 30 in the state that the IC card 1 is encased in the card case 30, the fingerprint sensor 7 of the IC card 1 is exposed outside the card case 30, and it becomes possible for the IC card 1 to acquire the biometric information (the fingerprint) even from the outside of the card case 30. Accordingly, it is possible to use the IC card 1 even when the IC card 1 is encased in the card case 30.

Additionally, the invention is not limited to the above-described embodiment but certainly allows various modifications within the gist of the invention.

The entire disclosure of Japanese Patent Application No. 2005-000083, filed Jan. 4, 2005 is expressly incorporated by reference herein.

What is claimed is:

1. A card case, which encases an IC card having a functional section that contains a biometric information-acquiring portion for acquiring biometric information and carries out communication with an outer part of the card when the biometric information acquired at the biometric information-acquiring portion is authenticated and having a power section that supplies power to the functional section, the card case comprising:
   a case body that can encase the IC card and has an opening at a position two-dimensionally overlapping with the biometric information-acquiring portion so that the biometric information-acquiring portion of the encased IC card is exposed outside the case;
   a lid that covers the opening and is capable of opening and closing;
   a functional section electrode that is provided on the case body and is electrically connected to the functional section of the IC card encased in the case body;
   a power section electrode that is provided on the case body and is electrically connected to the power section of the IC card encased in the case body; and
   a connection section that electrically connects the functional section electrode with the power section electrode in a state that the lid is open.

2. The card case according to claim 1, wherein the connection section electrically interrupts the functional section electrode from the power section electrode in a state that the lid is closed.

3. The card case according to claim 1, wherein the connection section comprises:
   a first wire connected to the functional section electrode and having an end part near the opening;
   a second wire connected to the power section electrode and having an end part near the opening in a manner that the second wire is not connected to the first wire; and
   an electrode provided so as to abut on the end part of the first wire and on the end part of the second wire in a state that the lid is open.

4. The card case according to claim 3, wherein the electrode is provided on the lid.

5. An IC card, comprising:
   a substrate;
   a functional section that is provided on the substrate, includes a biometric information-acquiring portion for acquiring biometric information, and communicates with an outer part of the card when the biometric information acquired at the biometric information-acquiring portion is authenticated;

a power section that is provided on the substrate and supplies power to the functional section;

a functional section terminal that is provided on the substrate so as to be electrically connected to the functional section and is electrically connected to the functional section electrode inside the card case according to claim 1; and a power section terminal that is provided on the substrate so as to be electrically connected to the power section and is electrically connected to the power section electrode inside the card case according to claim 1.

6. An IC card unit comprising:

an IC card including: a substrate; a functional section that is provided on the substrate and includes a biometric information-acquiring portion for acquiring biometric information and communicates with an outer part of the card when the biometric information acquired at the biometric information-acquiring portion is authenticated; a power section that is provided on the substrate and supplies power to the functional section; a functional section terminal that is provided on the substrate and is electrically connected to the functional section; and a power section terminal that is provided on the substrate and is electrically connected to the power section; and a card case including: a case body that can encase the IC card and has an opening at a position two-dimensionally overlapping with the biometric information-acquiring portion so that the biometric information-acquiring portion of the encased IC card is exposed outside the case; a lid that covers the opening and is capable of opening and closing; a functional section electrode that is provided on the case body and is electrically connected to the functional section of the IC card encased in the case body; a power section electrode that is provided on the case body and is electrically connected to the power section of the IC card encased in the case body; and a connection section that electrically connects the functional section electrode with the power section electrode in a state that the lid is open.

* * * * *